United States Patent [19]
Gazzoni

[11] Patent Number: 5,366,155
[45] Date of Patent: Nov. 22, 1994

[54] BY-PASS ARRANGEMENT FOR CONTROLLING THE RETURN FLOW OF A PILOT VALVE CONNECTED INTO AN IRRIGATION NETWORK

[75] Inventor: Adamo Gazzoni, Cesena, Italy

[73] Assignee: Enichem Agricoltura S.p.A., Palermo, Italy

[21] Appl. No.: 985,869

[22] Filed: Dec. 4, 1992

[30] Foreign Application Priority Data
Dec. 4, 1991 [IT] Italy .................... MI91A003251

[51] Int. Cl.$^5$ .................................................. B05B 1/08
[52] U.S. Cl. ........................................ 239/66; 239/99; 239/570; 137/102; 137/624.14
[58] Field of Search ............ 239/67, 68, 76, 99, 239/266, 533.1, 66, 570; 137/624.14, 102

[56] References Cited
U.S. PATENT DOCUMENTS

| | | | |
|---|---|---|---|
| 2,622,610 | 12/1952 | Rowe et al. | 239/76 |
| 2,706,520 | 4/1955 | Chandler | 239/76 |
| 3,720,232 | 3/1973 | Corliss et al. | 137/624.14 |
| 4,176,791 | 12/1979 | Cattaneo et al. | 239/76 |
| 4,246,921 | 1/1981 | Beccaria et al. | 137/624.14 |

Primary Examiner—Andres Kashnikow
Assistant Examiner—Christopher G. Trainor
Attorney, Agent, or Firm—Oblon, Spivak, McClelland, Maier, & Neustadt

[57] ABSTRACT

A valve arrangement of an irrigation system includes a by-pass; for controlling the return flow of a pilot valve, which by being connected between the outlet connection from the pilot valve and the return connection to the pilot valve eliminates the need for a return circuit and enables the arrangement to be connected downstream to an open circuit network used for the pulsating delivery of an irrigation liquid.

6 Claims, 4 Drawing Sheets

BY-PASS ARRANGEMENT FOR CONTROLLING THE RETURN FLOW OF A PILOT VALVE CONNECTED INTO AN IRRIGATION NETWORK

BACKGROUND OF THE INVENTION

Field of the Invention

This invention relates to a by-pass arrangement for controlling the return flow of a pilot valve, which by being connected between the outlet connection from the pilot valve and the return connection to the pilot valve eliminates the return circuit and enables said arrangement to be connected downstream to an open circuit network used for the pulsating delivery of an irrigation liquid. The patents GB 1,286,538, GB 1,484,588, U.S. Pat. Nos. 3,698,195 and 4,009,832 describe localized open-circuit irrigation systems, widely used in agriculture, comprising a pipe directly connected to a feed source (hydraulic pump, pressurized water circuit etc.), from which hoses and secondary pipes of smaller dimensions extend at more or less regular intervals to disperse the liquid over the ground.

These secondary pipes or hoses are themselves variously structured to distribute the liquid as uniformly as possible, even at the points furthest from the source. All comprise pressure release means to cause the liquid to emerge in small quantities (droplets).

With these open circuit systems it is however difficult to achieve uniform irrigation at all points of the ground.

U.S. Pat. No. 4,176,791 describes an irrigation system comprising a pilot valve connected upstream to a pressurized liquid source and from which a succession of pipe sections extends, these being connected together in series by secondary valves provided with a spray nozzle.

The succession of pipe sections starts from the pilot valve and returns to it to form a closed ring.

Although this irrigation system improves the uniformity of liquid distribution over the ground compared with open systems, it is complicated by the use of a double pipe, i.e., an outward pipe and a return pipe to the pilot valve.

In addition, in a closed circuit it is difficult to expel the air which accumulates in the circuit with time and disturbs the correct operation of the valves.

Again, patent application IT 22449A/87 in the name of the present applicant describes a device for automatic pulsating delivery of an irrigation liquid connected downstream to a distribution network provided with valves sensitive to the pressure variations produced by a Venturi device which transmits them to a sliding member.

Said device is complicated by the presence of two counter-pressure membranes, one interposed between said sliding member and the source liquid feed orifice and the other interposed between said sliding member and the bleed orifice to atmosphere. It is the mechanical sliding of the piston and the extreme elasticity of the membranes which enable the valves included in the distribution network to open and close so that the liquid can escape and irrigate the ground.

Even though the system is theoretically usable, its lack of practical usability means that it has been almost completely abandoned.

SUMMARY OF THE INVENTION

To overcome the drawbacks of the known art, the applicant has now found that by connecting a suitable device, described hereinafter in detail, between the outlet pipe and the inlet pipe of the pilot valve, an irrigation system is obtained which because it is of open circuit type eliminates the drawbacks of the closed circuit such as the trapping of air, hence achieving uniform irrigation at all points of the ground.

In addition, the elimination of the return half-ring considerably simplifies the practical implementation of said system.

The present invention therefore provides a by-pass arrangement for controlling the return flow of a pilot valve, which by being connected between the outlet connection from the pilot valve and the return connection to the pilot valve eliminates the return circuit and enables said arrangement to be connected downstream to an open circuit network used for the pulsating delivery of an irrigation liquid.

The present invention further provides the irrigation system in which the device of which said by-pass arrangement forms a part is connected to a distribution network comprising a plurality of pressure-sensitive valves provided with a delivery nozzle.

BRIEF DESCRIPTION OF THE INVENTION

The invention is described hereinafter with reference to the accompanying drawings, in which.

DESCRIPTION OF THE PREFERRED EMBODIMENT

Figure 1:
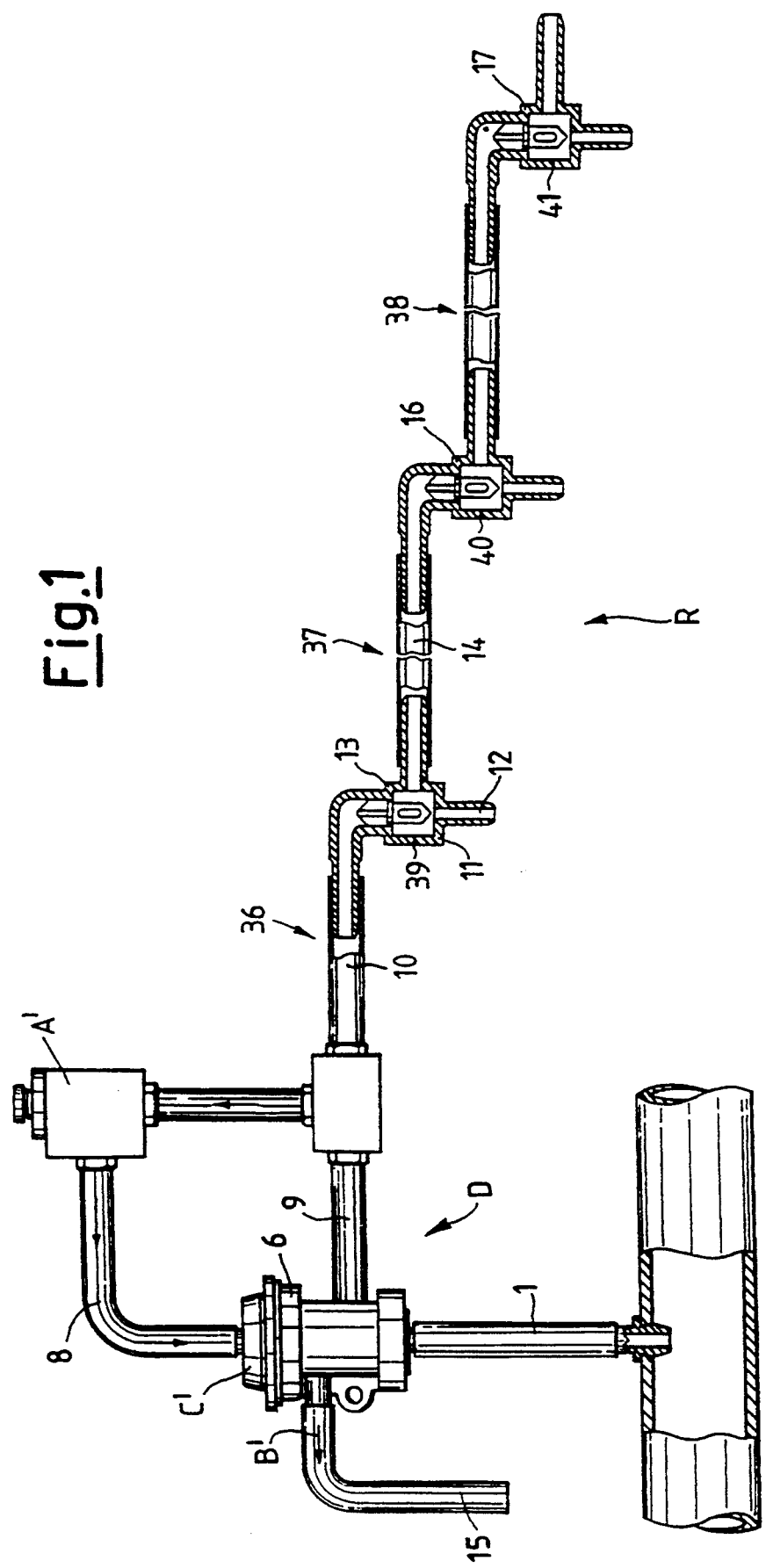
FIG. 1 is a vertical section through an irrigation system in which the device of FIG. 2 is connected to a liquid distribution network provided with pressure-sensitive secondary valves.

With reference to FIG. 1, the irrigation liquid originating from the tank feeds the line by flowing from the pipe 1 through the valve 6 and pressing the plug 3 upwards with a certain force, aided by the action of the spring 2. Water hence enters the line section 9 and fills the entire hydraulic circuit.

When all the line sections are full, the water enters the chamber 5 via the by-pass arrangement according to the invention, to press against the diaphragm 7 and push it downwards with a certain force.

At a determined instant the hydraulic circuit is in equilibrium because the force exerted by the pressure on the diaphragm 7, being of greater surface area than the plug 3, equals the pressure exerted on the plug 3 plus the force exerted by the spring 2.

As the pressure in the pipe 1 increases, the force exerted on the diaphragm 7 prevails over that exerted on the plug 3 to open the port 4. The water present in the line section 9 then leaving from the line section 15 to create negative pressure in the line comprising the delivery units 13, 16, 17 etc.

As soon as the line section 10 reaches atmospheric pressure, the plug 3 returns to its shut-off position, water again fills the various line sections and the cycle recommences.

The rate of filling of the chamber 5 and hence the delivery frequency can be adjusted by adjusting the valve of the present invention.

The advantages deriving from this irrigation system have been previously described.

The second aspect of the present invention relates to irrigation systems incorporating the device of which said by-pass arrangement forms part, for the automatic pulsating delivery of the irrigation liquid.

In such systems said device is connected to a distribution network consisting of a series of line sections each provided at its downstream end with a pressure-sensitive secondary valve fitted with a delivery nozzle.

Figure 3:
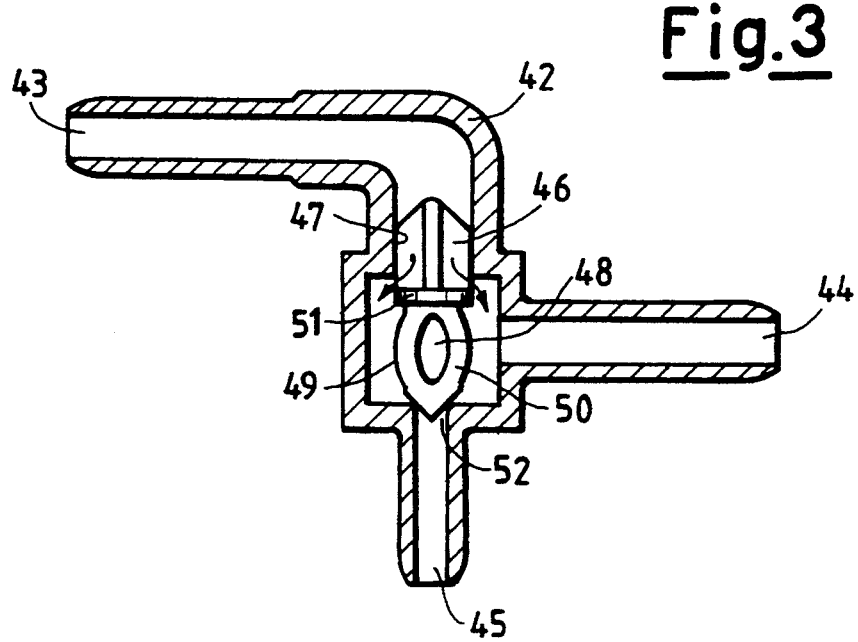
FIGS. 3 and 4 are vertical sections through particular embodiments of the secondary valves usable in the distribution network of the irrigation system of FIG. 1.
Figure 4:
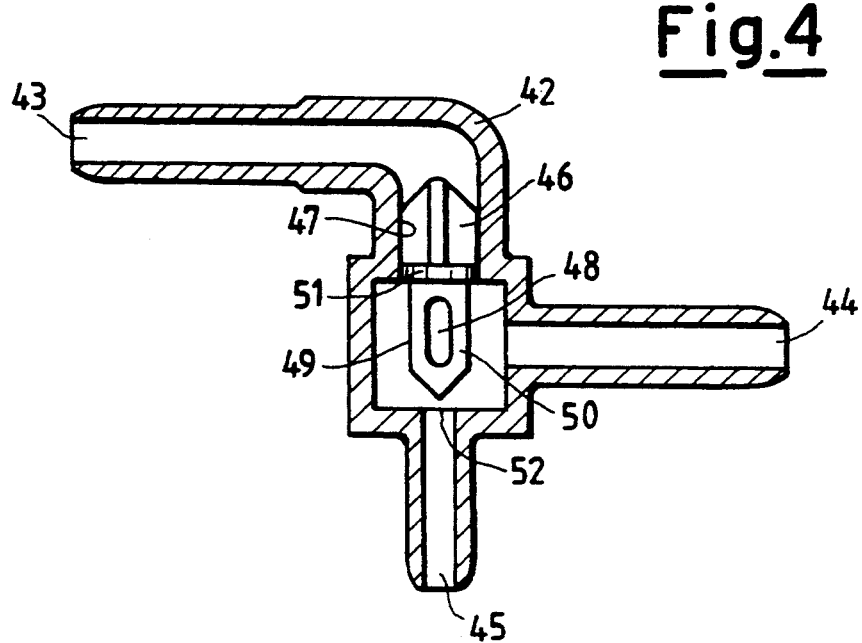

In a preferred embodiment the secondary valves connected to the network have the configuration shown in FIGS. 3 and 4. Specifically, in these figures it can be seen that the valve consists of a body 42 comprising the entry channel 43, the exit channel 44 and the delivery nozzle 45.

Inside the valve there is a piston 46 provided with a seal disc 51 to which the valving member 48 is connected. This latter consists of two flexible plastics columns 49 and 50, and when the piston 46 slides in its cylindrical guide 47 it closes the seat 52 on the delivery nozzle 45 or closes the entry channel 43, depending on the pressure in the channels 43 and 44.

During the filling stage the described pulsating device fills the distribution network until the network pressure reaches a value equal or close to the source pressure.

In this respect, with reference to FIGS. 1, 3 and 4, during the filling stage the liquid passes under the effect of the source pressure through the pulsating distributor D and the section 36 of the network R to reach the secondary valve 39. Within this valve the liquid presses against the piston 46, which itself urges the valving member 48 against the seat 52 to close it.

The liquid feed pressure also lowers the seal disc 51. This is facilitated by the flexibility of the plastic material with which the columns 49 and 50 of the valving member 48 are constructed. The lowering of the seal disc 51 opens a passage between the entry channel 43 and the exit channel 44 to hence fill the section 37 of the network R as far as the valve 40. This filling then continues until the entire network is filled.

When the network filling is complete, the liquid flow stops, and the feed pressure discharges through the by-pass and onto the diaphragm 7 to lower the plug 3. In this manner the line section 9 is connected to atmosphere 15 via the port 4, with a consequent drop in the pressure.

This drop in pressure is transmitted firstly to the section 36 of the network R, the effect of the difference in pressure between the section 37 (at a pressure equal or approximately equal to the source pressure) and the network section 36 (at atmospheric or approximately atmospheric pressure) causing the piston 46 of the valve 39 to move upwards into seat 47, dragging with it the valving member 48 which hence releases the seat 52 with consequent escape of irrigation liquid from the nozzle 45.

This escape of liquid from the section 37 continues until the pressure in said network section 37 reaches atmospheric or approximately atmospheric pressure.

The phenomenon is repeated for the various subsequent sections of the network R until the last network section.

The time for which the secondary valves open is measurable in terms of fractions of a second.

The refilling of the network R by the pulsating device D begins from the moment at which the pressure in the network section 36 has fallen to atmospheric or approximately atmospheric.

The time for refilling the network is greater than the emptying time and can vary from a few seconds to some tens of seconds depending on the size of the irrigation system, the flow rate of irrigation liquid from the circuit as controlled by the by-pass valve, and the feed pressure of the pulsating valve D.

The energy which enables the individual network sections to discharge the irrigation liquid by virtue of the available pressure is provided by the elasticity of the network, which is usually of plastics construction.

In the case of a poorly elastic network (for example of steel), each network section can be provided with a suitable elastic expansion chamber of dimensions chosen on the basis of the quantity of irrigation liquid to be delivered at each cycle.

Figure 5:
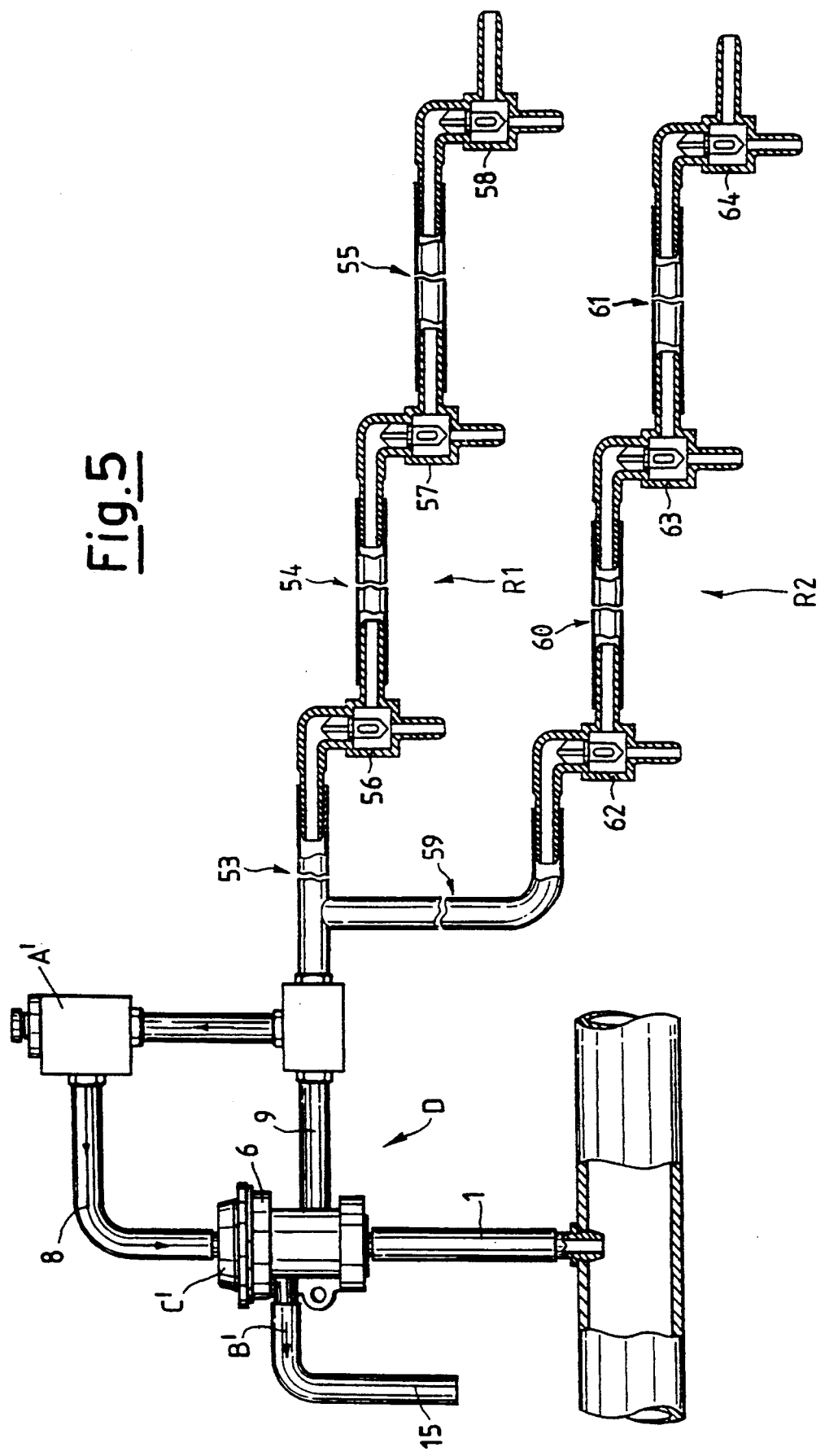
FIG. 5 is a vertical section through a particular embodiment of the irrigation system.

FIG. 5 shows an example of a branched distribution network. In this case downstream of the pulsating device D there are two distribution network branches, namely the branch R1 formed of the sections 53, 54 and 55 with valves 56, 57 and 58 interposed between said sections, and the branch R2 formed of the sections 59, 60 and 61 with respective valves 62, 63 and 64.

Figure 2:
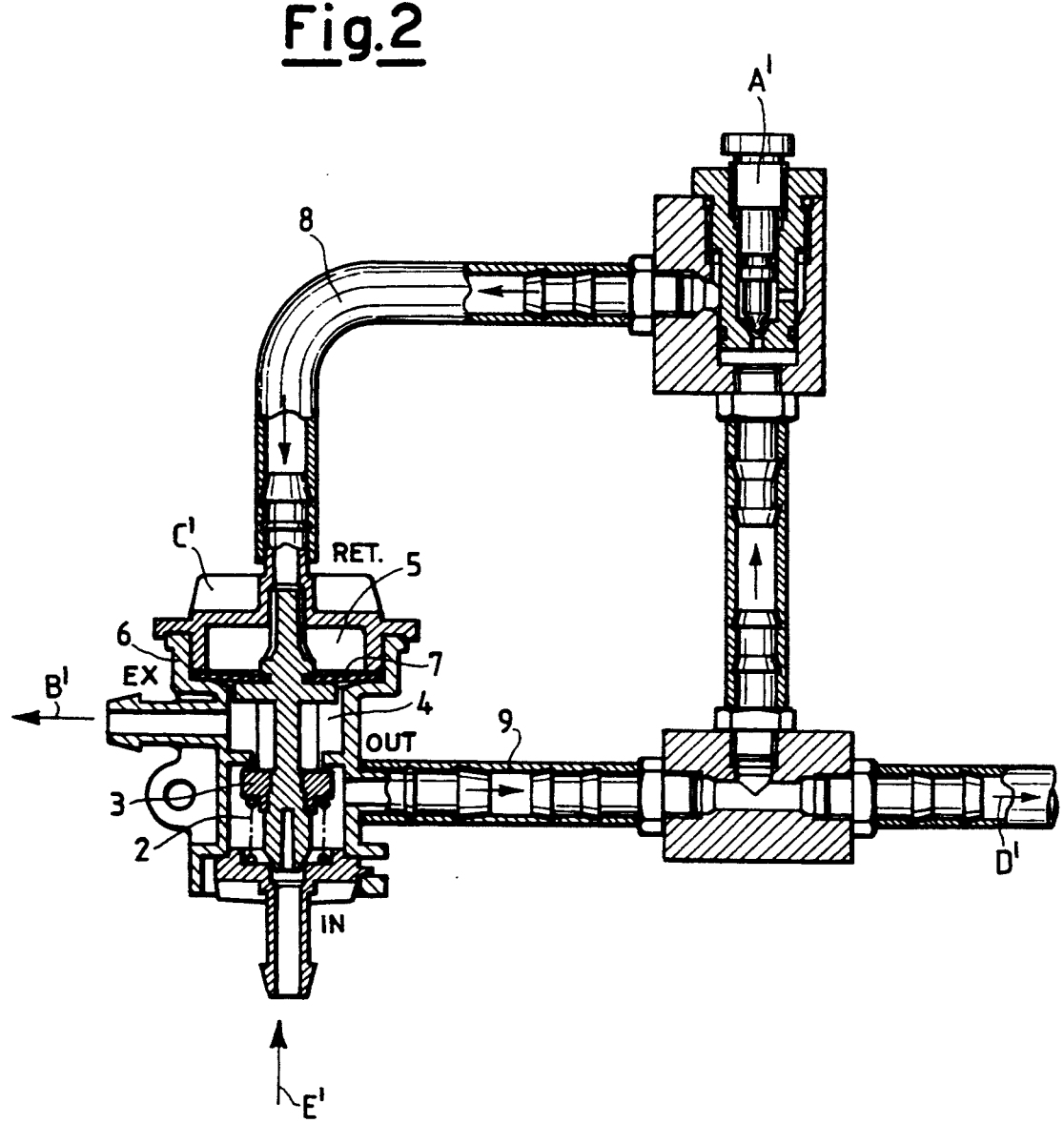
FIG. 2 is a vertical section through one embodiment of the device for the automatic pulsating delivery of an irrigation liquid, of which the parts shown in section are the subject of the present invention.

In the figures A' indicates the flow control valve which is adjustable due to the threaded connection shown in the upper part thereof in FIG. 2, B' indicates the discharge from the pilot valve, C' indicates the pilot valve, D' indicates the feed pipe to the delivery units and E' indicates the entry for the irrigation liquid.

I claim:

1. An irrigation system comprising a valve arrangement for providing a pulsating supply of an irrigation fluid to a distribution network, said valve arrangement comprising a bypass arrangement connected between an outlet connection from the pilot valve and a return connection to the pilot valve, the bypass arrangement eliminating a need for an irrigation system return circuit and enabling said valve arrangement to be connected to an open circuit network to pulse delivery of the irrigation fluid to the distribution network, said valve arrangement comprising said bypass arrangement and said pilot valve, said pilot valve including a diaphragm, a diaphragm chamber, an exhaust port, said return connection, said outlet connection, and said inlet connection, wherein fluid pressure in said diaphragm chamber controls the position of the diaphragm to alternatingly direct a pressurized liquid source between the exhaust port and the pilot valve outlet connection, said bypass arrangement comprising a flow control valve, a three-way connector, and first and second delivery line sections connected between the three-way connector and the flow control valve and between the flow control valve and said pilot valve return connection, respectively, to allow for continuous restricted connection between the diaphragm chamber and said first delivery line section.

2. An irrigation system as claimed in claim 1, which comprises said pressurized liquid source connected upstream of said three-way connector and the irrigation liquid distribution network connected downstream of said three-way connector, wherein said network comprises a plurality of pressure-sensitive secondary valves each of which has a delivery nozzle.

3. An irrigation system as claimed in claim 2, wherein said secondary valves of the distribution network comprise a valve body having an entry channel, an exit channel and said delivery nozzle connected thereto, said valve body also including a piston connected to a valving member via a seal disc, said valving member having two connected columns of flexible plastic material.

4. An irrigation system as claimed in claim 1, wherein said delivery line section is non-expandable.

5. An irrigation system as claimed in claim 1, wherein said flow control valve comprises an adjustable flow control valve for adjusting flow of irrigation liquid therethrough.

6. An irrigation system as claimed in claim 2, wherein at least one of said secondary valves includes a slidable seal member with deformable leg members and a seat against which said leg members are engageable under fluid pressure of the irrigation liquid and wherein said irrigation liquid is discharged therefrom when said secondary valves are vented to atmosphere.

* * * * *